INVENTOR.
YVES CHARLES SUEL,

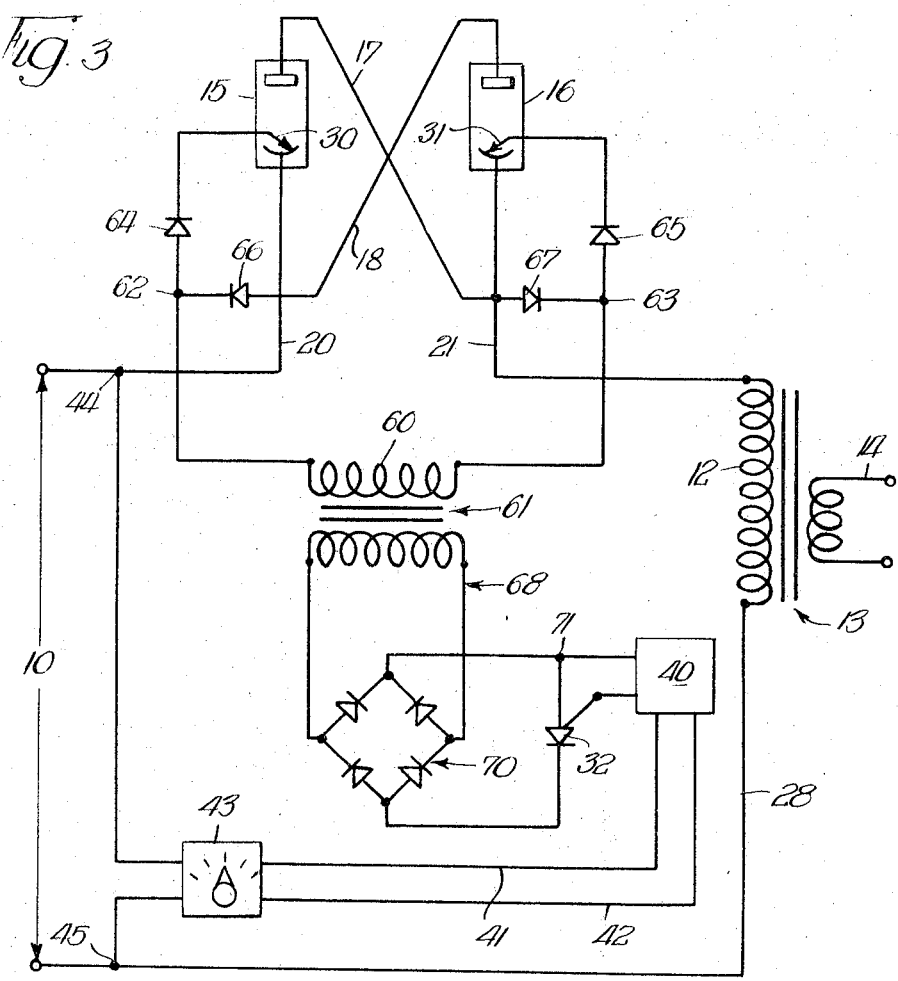
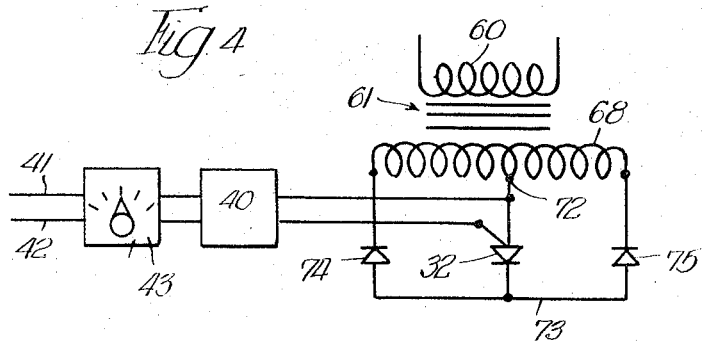

United States Patent Office 3,312,890
Patented Apr. 4, 1967

3,312,890
CONTROL MEANS FOR AN ELECTRIC
ENERGY SUPPLY CIRCUIT
Yves Charles Suel, Thiais, Seine, France, assignor to Welding Research, Inc., Chicago, Ill., a corporation of Illinois
Filed July 9, 1963, Ser. No. 293,779
1 Claim. (Cl. 323—24)

The invention relates to installations for supplying electric energy from an alternating current source and has reference in particular to improvements for controlling the firing of the electric discharge valves of the type generally employed in such installations.

When electric discharge valves are employed, it is customary to connect them in a back-to-back relation with their output having connection with the load circuit. The electric discharge valves are provided with a control electrode and alternate conduction of the valves is controlled, or in other words, the valves are fired by using thyratrons for controlling the flow of current to the control electrode. Heretofore installations employing electric discharge valves of the type having a control electrode have employed one thyratron for each discharge valve.

The main objective of the present invention is to provide circuit means capable of improved operation and wherein only one thyratron type of rectifier is required for controlling a group of two discharge valves connected in back-to-back relation. More particularly the thyratron type of rectifier contemplated by the invention is a dry silicon controlled rectifier. The control current will be synchronous with the alternating current source and the silicon controlled rectifier will supply electric impulses which will be passed to the respective valves for firing the same in an alternate manner.

With these and various other objects in view, the invention may consist of certain novel features of construction and operation, as will be more fully described and particularly pointed out in the specification, drawings and claim appended thereto.

In the drawings which illustrate an embodiment of the device and wherein like reference characters are used to designate like parts:

FIGURE 3 is another schematic diagram illustrating another circuit arrangement coming with the invention, and FIGURE 4 shows schematically a form of circuit means such as can be substituted for the rectifier circuit of FIGURE 3.

Figure 1:
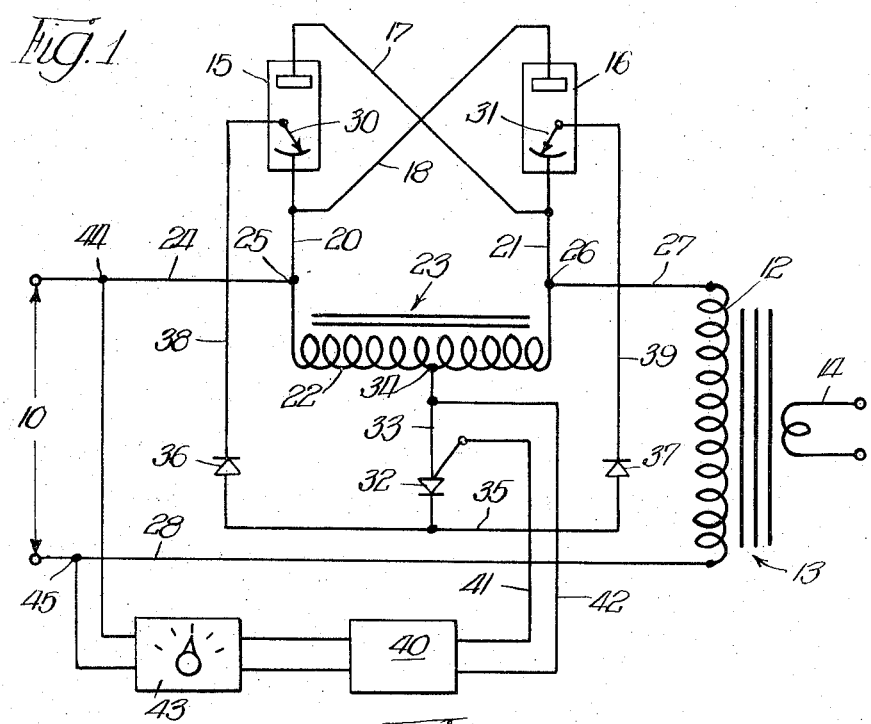
FIGURE 1 is a schematic diagram illustrating one circuit arrangement employing a single rectifier for control purposes in accordance with the invention.

The device of FIGURE 1 schematically illustrates an installation for supplying electric energy from an alternating current source 10 to a load circuit 12 such as may comprise the primary winding of a welding transformer 13, having a secondary circuit 14. The electric discharge valves 15 and 16 are connected in back-to-back relation by conductors 17 and 18 which connect with the cathode conductors 20 and 21 to connect the anode of one valve with the cathode of the other valve. The conductors 20 and 21 comprise the terminal leads of the winding 22 of the magnetic core transformer 23. One conductor 24 from the alternating current source 10 is connected at 25 to the conductor 20. In a similar manner conductor 21 is connected at 26 to a conductor 27 having electrical connection with one terminal of the load winding 12. The other terminal of said winding 12 is joined to conductor 28 which connects with the other line of the alternating current source. Electric discharge valves 15 and 16 are provided with control electrodes 30 and 31, respectively, and it will be understood that said valves will become conductive when a current is applied to said electrodes of sufficient magnitude to cause ionization of the gas within the valve and provided their anode is positive with respect to their cathode.

In accordance with the invention the current for firing the discharge valves 15 and 16 is obtained from a single thyratron type rectifier 32 which is joined by conductor 33 to the center tap 34 on winding 22, and to the conductor 35 which connects the two diodes or rectifiers 36 and 37. The said rectifiers 36 and 37 pass current in one direction only. From the rectifiers the conductors 38 and 39 join the same to the control electrodes 30 and 31, respectively.

The rectifier 32 is a semi-conductor and preferably a transistor type silicon controlled rectifier. Current pulses are supplied to the rectifier 32 at a frequency of 120 cycles per second by the pulse generator 40 connected to the rectifier by the conductors 41 and 42. The phase of the pulses with respect to the voltage of the alternating current source 10 is adjusted by means of a phase shifting circuit 43 connected at 44 and 45 to the terminals of the alternating current source which has a frequency of 60 cycles per second.

Figure 2:
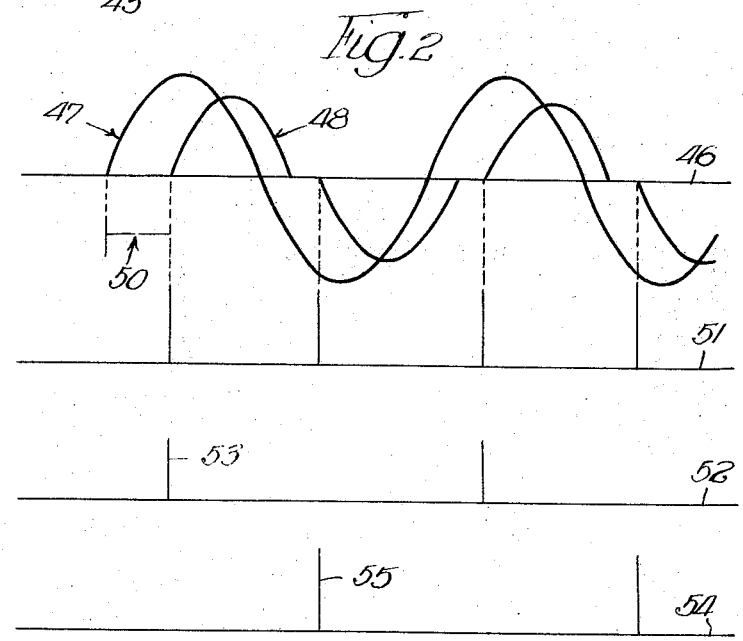
FIGURE 2 shows certain voltage diagrams and illustrates their relation to the operation of the circuit arrangement of FIGURE 1.

FIGURE 2 illustrates the mode of operation of the circuit arrangement of FIGURE 1. On a time basis 46 the voltage of the alternating current source is shown as a sine wave designated by numeral 47. The phase shifted current pulses passed by the electric discharge valves are represented by the positive and negative half waves 48, with the extent of the phase shifting being indicated by numeral 50. On axis 51 are shown the pulses at 120 cycles which are supplied to the rectifier 32, the same being indicated by vertical lines and which are synchronous with the alternating current source. Assuming that terminal 21 of winding 22 is positive with respect to terminal 20, then when the first pulse shown on axis 51 is applied to the semi-conductor rectifier 32, the center tap of winding 22 will also be positive with respect to the terminal 20 and the rectifier will be conductive. The current passed by the control rectifier will flow through the rectifier 36 and to the control electrode 30 of valve 15. The current pulse is shown on axis 52 as a vertical line 53. Since the anode of valve 15 is positive with respect to its cathode, the valve will fire and become conductive, thus passing an impulse of current from the alternating current source 10 to the load winding 12.

Although a current pulse will also be supplied by the control rectifier to rectifier 37 and which will be passed by the said rectifier, nevertheless the valve 16 is not rendered conductive since its anode is negative.

When the polarity of winding 22 reverses on the next half cycle, the second pulse produced by generator 40 is applied to the rectifier 32 which is rendered conductive and the pulse is passed to the rectifier 37. The rectifier 37 will pass the current pulse to the control electrode 31 of valve 16. The current pulse is shown on axis 54 by the vertical line 55. Since the anode of valve 16 is now positive with respect to its cathode, the valve will fire and become conductive to pass another impulse of current from the alternating current source to the load circuit 12.

It will be understood from the foregoing that the firing of two discharge valves in back-to-back relation can be controlled by a single silicon controlled rectifier. Said control rectifier and also the rectifiers 36 and 37 are subjected to considerably reduced voltages by means of the winding 22 and the center tap 34. This reduction in voltage permits a reduction in the cost of the control rectifier and the cost factor is even lower when lower values of voltage are applied to the electrodes.

The control circuit of FIGURE 1 can be applied to the other circuit arrangements such as that shown in FIGURE 3, wherein the same reference characters are used to designate those elements common to both figures. The primary winding 60 of the transformer 61 is connected to the terminals 62 and 63 of the rectifiers 64 and 65, which in turn have connection with the control electrodes 30 and 31 of the discharge valves 15 and 16. The terminals 62 and 63 are also connected to the cathode respectively of the said discharge valves, the connections including the rectifiers 66 and 67. The rectifiers as so arranged including 64 and 66 for discharge valve 15 and rectifiers 65 and 67 for discharge valve 16 constitute a well known circuit arrangement which has been in use for many years to control the firing of the two discharge valves having a single contact connecting the terminals 62 and 63. However, as regards the circuit of FIGURE 3 the connection is obtained by causing the closing and energization of the secondary circuit 68 of transformer 61 by means of the control rectifier 32. The energization of the secondary winding of transformer 61 results in the energization of the primary winding 60 which supplies an impulse of current to each of the control electrodes 30 and 31.

The secondary circuit 68 gives a no-load voltage which is lower than the primary voltage in order to permit use of inexpensive rectifiers. The secondary voltage is full-wave rectified by means of the rectifier 70. As a result, the voltage applied to the terminal 71 of the control rectifier 32 is always positive and when a control voltage is applied to the electrode of the same by the pulse generator 40, the same cycle of operation takes place as described with respect to the circuit arrangement shown in FIGURE 1.

A variation of the circuit of FIGURE 3 is shown in FIGURE 4. The transformer 61 having the primary winding 60 and the secondary winding 68 is the same as that shown in FIGURE 3. Also, the electric discharge valves in back-to-back relation have the same connection to the terminals of the winding 60. However, in FIGURE 4 the full wave rectifier 70 has been omitted and a different rectifying circuit has been substituted therefor. The phase shifting circuit 43 and the pulse generator 40 are connected by the conductors 41 and 42 to the control rectifier 32. One terminal of the rectifier 32 is connected to the center tap 72 on the secondary winding 68, and the other terminal of the same is connected to the conductor 73. The said conductor 73 is connected to the terminals of windings 68 through the rectifiers 74 and 75.

The rectification of the voltage controlled by the rectifier 32 is obtained by the rectifiers 74 and 75, and by the connection of the rectifier 32 to the center tap on the secondary winding of the transformer 61.

In the circuit arrangements of the invention, the single control rectifier is a semi-conductor and preferably a silicon controlled rectifier is employed. During operation the voltage pulses supplied to the control rectifier are double the frequency of the alternating current source. The electric discharge valves are inversely connected, that is, in back-to-back relation, and the control rectifier as herein contemplated passes the current pulses to the electrodes of both discharge valves on each pulse. However, the discharge valves will fire in an alternate manner, since their anodes are positive on alternate pulses and such discharge valves will conduct only when their anode is positive. The electric discharge valves are thus rendered conductive to pass the positive and negative half cycles, respectively, of the alternating current source to the load circuit.

The invention is not to be limited to or by details of construction of the particular embodiment thereof illustrated by the drawings, as various other forms of the device, will of course be apparent to those skilled in the art without departing from the spirit of the invention or the scope of the claim.

What is claimed is:

In a system for supplying power from a source of alternating current to a load, the combination of an electric circuit including a pair of electric discharge valves connected in back-to-back relation between the source and the load, said valves each having an anode, a cathode and a control electrode, said electric circuit including the primary winding of a transformer, conductors joining the terminals of the primary winding with the control electrodes of the valves, respectively, a rectifier in each of the conductor circuits for passing current pulses in one direction only to the electrodes, a single silicon controlled rectifier for supplying current pulses, a full wave rectifier electrically connected between the silicon controlled rectifier and the terminals of the secondary winding of said transformer, whereby the current pulses from the silicon controlled rectifier are supplied to the control electrodes for rendering the discharge valves conductive, and a pulse generator for supplying current pulses to the silicon controlled rectifier at a frequency double the frequency of the alternating current source.

References Cited by the Examiner

UNITED STATES PATENTS

| | | | |
|---|---|---|---|
| 2,242,894 | 5/1941 | Lyle | 219—114 |
| 2,242,942 | 5/1941 | Diamond | 219—114 |
| 2,817,056 | 12/1957 | Bates | 323—4 |
| 3,229,116 | 1/1966 | Anger | 315—196 |

JOHN F. COUCH, *Primary Examiner.*

LLOYD McCOLLUM, *Examiner.*

K. D. MOORE, *Assistant Examiner.*